United States Patent [19]
Swanson

[11] 3,727,950
[45] Apr. 17, 1973

[54] DIRT SEAL RING FOR PIPE SWIVEL JOINTS

[75] Inventor: Harold N. Swanson, Anaheim, Calif.

[73] Assignee: FMC Corporation, San Jose, Calif.

[22] Filed: Nov. 1, 1971

[21] Appl. No.: 194,202

[52] U.S. Cl. ............... 285/13, 277/212 R, 285/45, 285/276, 285/DIG. 11
[51] Int. Cl. ............................................. F16l 11/12
[58] Field of Search ..................... 285/276, 13, 45, 285/14, 277, DIG. 11, 379, 347; 277/212 R, 115, 170, 177, 201

[56] References Cited

UNITED STATES PATENTS

| | | | |
|---|---|---|---|
| 3,264,006 | 8/1966 | Downs | 285/13 X |
| 1,662,603 | 3/1928 | Ferguson | 277/212 |
| 1,871,883 | 8/1932 | Geyer | 285/45 X |
| 2,872,217 | 2/1959 | May | 285/45 |
| 3,515,396 | 6/1970 | MacVaugh | 277/177 |

FOREIGN PATENTS OR APPLICATIONS

| | | | |
|---|---|---|---|
| 1,348,390 | 12/1963 | France | 277/170 |
| 652,347 | 4/1951 | Great Britain | 285/276 |
| 184,970 | 9/1963 | Sweden | 285/DIG. 11 |

*Primary Examiner*—Dave W. Arola
*Attorney*—F. W. Anderson et al.

[57] ABSTRACT

A pipe swivel joint with a one-piece, elastomeric dirt seal ring for protecting the joint's ball race chamber against intrusion of contaminants from the outside environment, and to relieve the ball race chamber from excessive pressure resulting from leakage past the joint's packing. The seal ring is located in the annulus between the joint's male and female elements, and comprises a body portion that fits into an outer annular groove on the male element to retain the seal in proper functioning position, a lip portion that fits tightly against both male and female elements to provide a seal therebetween, and a stretchable intermediate web-like portion interconnecting the body and lip portions. When the swivel joint is fully assembled with the seal ring installed, the intermediate portion is stretched axially to maintain the lip in sealing contact with both joint elements, precluding entry of outside contamination into the ball race chamber yet facilitating escape of pressure from it to the outside.

6 Claims, 4 Drawing Figures

PATENTED APR 17 1973 3,727,950
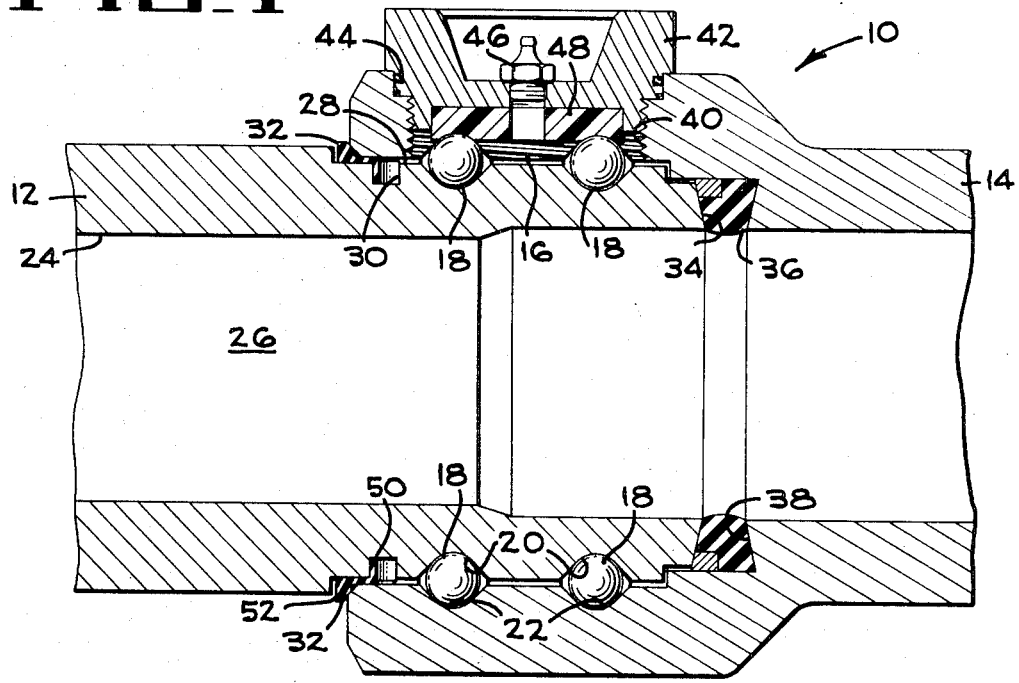
FIG. 1
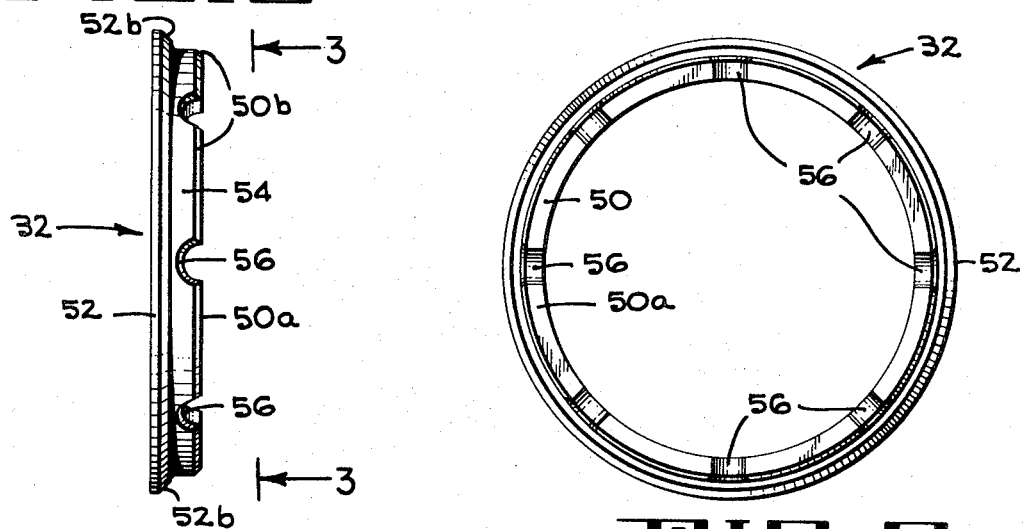
FIG. 2
FIG. 3
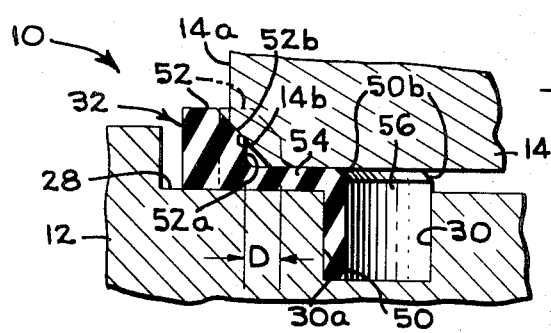
FIG. 4
INVENTOR.
HAROLD N. SWANSON
BY C.E. Tripp — ATT'Y
—AGENT

DIRT SEAL RING FOR PIPE SWIVEL JOINTS

BACKGROUND OF THE INVENTION

This invention relates to pipe swivel joints and seal elements therefore, and more particularly to dirt seal elements that relieve excessive pressure from within the ball race chamber of the joint while precluding entry into the chamber of undesireable materials from the outside atmosphere.

Pipe swivel joints, generally comprising interfitted male and female conduit elements rotatably secured together by an annular ball bearing system and sealed in fluid tight relationship by an annular packing, are used extensively for interconnecting the pipe sections of marine loading arms and other articulated fluid transfer equipment. The bearing system of these swivel joints provides not only a means to rotate one joint element with respect to the other, but to securely interconnect the two elements against movement in an axial direction with respect to each other. In order to accomplish these functions, the joint's bearing system often is manufactured to rather close tolerances and thus is susceptive to binding or freezing-up when contaminated by materials entering it either from within the joint past the packing or from the outside atmosphere past the dirt or dust seal. High pressure in the bearing's ball race chamber presents another serious problem, for unless this excessive pressure is relieved or vented to the outside the joint often will not function properly.

In order to overcome the foregoing problems, dust seals, such as described in U.S. Pat. No. 3,264,006 to K.J. Downs, have been developed for precluding entry of contamination from outside the swivel joint into the ball race chamber, and yet provide a means of escape for fluid or excessive pressure from the chamber to the atmosphere. These dust seals act much like a check valve by releasing their seal against the joint to provide a passage-way from the chamber to the outside to relieve pressure, and by preventing entry of outside contaminants into the chamber. Although such dust seals have, in most cases, functioned effectively against outside contamination, at times they fail to relieve pressure inside the ball race chamber. Experience indicates that when any configuration of elastomeric seal ring contained entirely within the confines of the groove in the joint's male element is subjected to pressure on the ball race chamber side, it will tend to extrude into the annulus between the male and female elements in typical O-ring fashion, thereby sealing in, rather than venting, such pressure.

SUMMARY OF THE INVENTION

This invention comprises a one-piece dirt seal ring of elastomeric construction, having an annular body portion designed for fitting into a groove in the outer surface of a swivel joint's male element to retain the seal ring in proper functioning position, an annular lip portion spaced axially from the body portion in a direction away from the joint's ball race chamber and designed to fit rightly against a radial end surface of the joint's female element, and an intermediate resiliently stretchable web portion interconnecting the body and lip portions. The seal ring is dimensioned so that when the web is in its relaxed condition the body and lip portions are spaced closer together than the distance between the male element's annular groove and the annular radial end surface of the female element. As a result of this dimensioning, hen the seal ring is installed in the swivel joint the web portion is stretched in an axial direction away from the ball race chamber, thus holding the lip portion tightly against the joint's female element.

In the described preferred embodiment, the inner edge of the swivel joint female element's radial end surface is beveled at about a 45° angle, and the outer edge of the radial surface of the lip facing the female element's end surface likewise is beveled at about 45°, to provide an annular and conical contact area between the lip and the female element. The stretched, and thereby tensioned, condition of the seal ring's web functions in cooperation with this conical contact relationship to bias the lip into tight engagement also with the joint's male element, thus establishing a barrier between both female and male elements to passage of materials from the outside into the ball race chamber, yet facilitating release of pressure, etc., from the chamber to the outside.

The seal ring's body portion includes radially oriented grooves spaced about and extending across its inner radial end surface, and the inner edge of this surface and that of the grooves corresponding to it are beveled, to facilitate venting pressure past the body portion and on to the atmosphere outside the joint.

Accordingly, one object of this invention is to provide a dirt seal ring for a pipe swivel joint that will preclude entry of outside contamination into the joint's ball race chamber, and maintain a yieldable yet tight seal between the joint's relatively rotatable male and female elements.

Another object of this invention is to provide an improved, one-piece dirt seal ring for a pipe swivel joint, which ring functions in the nature of a relief valve to encourage venting of excessive pressure from the joint's ball race chamber to the outside atmosphere, and to establish a tight seal in the opposite direction between the joint's relatively rotatable elements.

Still another object of the invention is to provide a pipe swivel joint with a more positive, longer lasting, and self-energizing seal ring element that prevents internal contamination by dirt and other undesireable materials from the atmosphere.

BRIEF DESCRIPTION OF THE DRAWINGS

FIG. 1 is a central longitudinal section of a pipe swivel joint according to the present invention, showing the dirt seal ring installed for precluding entry of foreign material from the outside, and for relieving excessive pressure from the joint's ball race chamber.

FIG. 2 is a side view of the dirt seal ring of FIG. 1, as it appears when in an unstretched condition.

FIG. 3 is an end view of the dirt seal ring of FIG. 2, as viewed in the direction of the arrows 3—3 in FIG. 2.

FIG. 4 is an enlarged fragmentary section, showing the dirt seal ring and a portion of the male and female elements of the swivel joint of FIG. 1, illustrating in phantom lines the stretch imparted to the seal ring when it is placed in functional position in the joint.

DESCRIPTION OF THE PREFERRED EMBODIMENT

Broadly considered, and with initial reference to FIG. 1 of the drawing, one form of swivel joint 10 embodying the principles of the present invention comprises an inner or male conduit element 12, an outer or female conduit element 14, and a ball race chamber 16 containing a plurality of ball bearings 18 in annular race ways 20,22 for swivelly interconnecting the elements 12,14.

The male element 12 has an inner wall 24 defining a flow passage 26, a cylindrical outer wall 28 with an annular groove 30 for retaining a dirt seal ring 32, and an end wall 34 that provides a dynamic sealing surface for a packing 36 that also statically seals against an end wall 38 of the female element 14.

In order to introduce the bearing balls 18 into their race ways 20,22, thereby securing the swivel joint elements 12,14 together, the female element 14 is provided with a threaded access passage 40 that is closed by a threaded plug 42, which plug is provided with an O-ring seal 44 and a grease fitting 46. So that the final position of the access plug 42, when fully tightened in the threaded access passage 40, is not critical, the inner face of the plug is provided with a resilient washer 48 of plastic or other material, which washer also facilitates formation of an extension of the bearing races 22 by the balls 18 upon relative rotation of the elements 12,14.

The dirt seal ring 32 of the present invention is illustrated more clearly in FIGS. 2–4, especially in FIG. 4 wherein the ring 32 is shown on an enlarged scale as it appears when installed in the swivel joint 10. This dirt seal ring includes a body portion 50 that is generally rectangular in cross-sectional configuration, a sealing lip portion 52 also generally rectangular in cross-sectional configuration, and a relatively thin web portion 54 intermediate, and attached to, the body portion 50 and the sealing lip portion 52. The body and lip portion are spaced axially from each other such that when the seal ring is installed properly in the swivel joint 10 the body portion 50 is nearest to the ball race chamber 16.

The radially extending surface 50a of the body portion 50 includes a plurality of circumferentially spaced and radially projecting notches 56 that are generally semi-circular in cross-section. These notches function to facilitate venting pressure from the ball race chamber 16 past the body portion 50 to the outside of the joint, and to thereby relieve excessive pressure from the chamber. The outer edge of the surface 50a is beveled at 50b, and this bevel also extends around the corresponding edge of the notches 56, to further aid in venting the swivel joint's ball race chamber to the atmosphere.

The inner edge of the annular end face 14a of the swivel joint's element 14 is beveled to provide an annular, conically configured sealing surface 14b for the dirt seal ring 32. The outer edge of the adjacent radial surface 52a of the seal ring's lip portion 52 is likewise beveled to provide a complementary annular and conically configured sealing surface 52b. Thus, and as seen best in FIG. 4, when the joint 10 is fully assembled with the dirt seal ring 32 in proper position, the sealing surface 52b fits flush with the sealing surface 14b, thereby providing a tight seal of substantial areal size between the ring 32 and the joint's female element 14 to preclude entry into the joint's ball race chamber 16 of contaminants from the outside.

In order to assure that the sealing lip 52 is in tight engagement with the joint's element 14, the seal ring's web portion 54 has an axial dimension less than the distance between the outer radial side 30a of the groove 30 and the female element's end surface 14a, so that the web is stretched an amount "D" when the seal ring is installed in the assembled joint, as shown in FIG. 4. The magnitude of stretch "D" is dependent partially upon the resiliency of the particular material from which the seal 32 is constructed, and also upon how much pressure it is desired that the lip 52 exert against the sealing surface 14b of the swivel joint's element 14. It can thus be seen that when the joint 10 is fully assembled the web 54 is in constant tension, and this tension is exerted on the sealing lip 52 to hold its surface 52b in tight engagement with the surface 14b of the joint's element 14.

When the pressure develops in the joint's ball race chamber 16 exceeding the tension exerted by the web 54 on the sealing lip 52, the seal between the lip's surface 52b and the female element's surface 14b will release to allow passage of this pressure, thereby venting the chamber 16 to the atmosphere. As soon as venting of this excessive pressure is accomplished, the lip's surface 52b returns to its sealing contact with the element's surface 14b, thereby preventing entry of undesirable materials into the swivel joint's ball race chamber 16. Hence, the dirt seal ring 32 truly functions in the nature of a check valve, readily permitting excessive pressure to escape from the joint past it to the atmosphere but absolutely preventing entry of contaminants from the atmosphere into the joint.

Because of the beveled surfaces 14b and 52b, and the constant tension of the seal ring's web 54 biasing the lip 52 towards the body 50, the lip 52 also is forced tightly against the annular surface of the outer wall 28 of the joint's male element 12, thereby providing a barrier between the seal ring 32 and this male element against passage of contaminants from outside the joint into the ball race chamber 16. Thus, the seal ring 32 functions as a complete, constant seal between both of the joint's elements 12 and 14, effectively precluding any type of foreign material from gaining access to the chamber 16 through the annulus between these elements.

Although the beveled surfaces 14b,52b are illustrated in the drawings as being approximately 45° with respect to the axis through the swivel joint, it should be understood that these surfaces could be at other angles so long as their function is retained.

The seal ring 32 is quite easily installed in the swivel joint 10, and because of its configuration cannot be installed incorrectly, since orientation in the reverse attitude, i.e., with the sealing lip 52 towards the bearing races 22, would preclude successful assembly of the joint's elements 12,14.

Although the best mode contemplated for carrying out the present invention has been herein shown and described, it will be apparent that modification and variation may be made without departing from what is regarded to be the subject matter of the invention.

What is claimed is:

1. A pipe swivel joint, comprising a female conduit element having at least one inner annular bearing raceway and an outer annular radial end surface, a male conduit element having at least one outer annular bearing raceway and an outer annular axial surface with a circumferential groove therein, rollable bearing elements disposed in said bearing raceways and rotatably holding the female and male conduit elements together, and a resiliently stretchable dirt seal ring including an annular body portion, an annular sealing lip portion spaced axially from said body portion, and a web portion intermediate to and interconnecting said body and lip portions, said web portion in its relaxed condition having an axial dimension less than the distance between said groove of the male conduit element and said end surface of the female conduit element, said body portion disposed in the groove of the male conduit element to retain said dirt seal ring in proper functioning position, and said lip portion disposed in sealing engagement with the end surface of the female conduit element to provide a barrier between the seal ring and the female element against entry of outside contaminants into the swivel joint, whereby said web portion is stretched axially and thus biases the lip portion towards the body portion for maintaining a tight seal between the lip portion and the female conduit element as well as to facilitate venting pressure from within the swivel joint to the outside atmosphere.

2. A swivel joint according to claim 1 wherein the dirt seal ring is of one-piece construction, and of elastomeric composition.

3. A swivel joint according to claim 1 wherein the dirt seal ring's lip portion has an annular, conically configured sealing surface that fits against the female element's radial end surface to provide a tight seal between the seal ring and the female element for excluding entry of undesirable material into the swivel joint from the outside atmosphere.

4. A swivel joint according to claim 3 wherein the female element's radial end surface is beveled to provide an annular, conically configured sealing surface complementary to the sealing surface of the seal ring's lip portion.

5. A swivel joint according to claim 4 wherein the sealing surfaces define an angle of approximately 45° with respect to the axis through the swivel joint.

6. A swivel joint according to claim 1 wherein the dirt seal ring's body portion has a radial end surface with at least one radial notch defined by wall means, and wherein the outer edges of said radial end surface and said wall means are beveled.

* * * * *